US009548932B2

(12) United States Patent
Bifulco et al.

(10) Patent No.: US 9,548,932 B2
(45) Date of Patent: Jan. 17, 2017

(54) METHOD AND SYSTEM FOR DETERMINING NETWORK-WIDE INTERACTIONS BETWEEN FORWARDING ELEMENTS IN A NETWORK

(71) Applicant: NEC EUROPE LTD., Heidelberg (DE)

(72) Inventors: Roberto Bifulco, Heidelberg (DE); Peer Hasselmeyer, Frankfurt (DE); Marcus Brunner, Leimen (DE)

(73) Assignee: NEC CORPORATION, Tokyo (JP)

( * ) Notice: Subject to any disclaimer, the term of this patent is extended or adjusted under 35 U.S.C. 154(b) by 173 days.

(21) Appl. No.: 14/236,092

(22) PCT Filed: Apr. 25, 2013

(86) PCT No.: PCT/EP2013/058673
§ 371 (c)(1),
(2) Date: Jan. 30, 2014

(87) PCT Pub. No.: WO2013/160423
PCT Pub. Date: Oct. 31, 2013

(65) Prior Publication Data
US 2014/0161134 A1 Jun. 12, 2014

(30) Foreign Application Priority Data
Apr. 27, 2012 (EP) ..................................... 12166042

(51) Int. Cl.
*H04L 12/851* (2013.01)
*H04L 12/701* (2013.01)
(52) U.S. Cl.
CPC ............... *H04L 47/24* (2013.01); *H04L 45/00* (2013.01)

(58) Field of Classification Search
CPC ............................ H04W 47/24; H04W 45/00
See application file for complete search history.

(56) References Cited

U.S. PATENT DOCUMENTS 6,484,171 B1 * 11/2002 Corl et al.
7,890,447 B2 * 2/2011 Abels et al. ................. 706/47
(Continued)

FOREIGN PATENT DOCUMENTS

WO     2004/019556     3/2004

OTHER PUBLICATIONS

International Search Report dated Jul. 18, 2013, corresponding to PCT/EP2013/058673.

Primary Examiner — Ian N Moore
Assistant Examiner — Justin T Van Roie
(74) Attorney, Agent, or Firm — Young & Thompson

(57) ABSTRACT

A method for detecting interactions on a forwarding element in a network, the element adapted to forward data according to rules, a rule set installed on the element, and including a match set and corresponding action set, the match set including at least one match field and the action set including one or more actions wherein action to be performed when matching a match set includes determining one or more relations between match sets based on match field relations, determining one or more relations between action sets, determining one or more interactions between rules based on determined relations between match sets and action sets, each rule being tested against another rule for determining the interaction, and reducing the rule set to an actual rule set according to determined interactions so that the actual rule set includes only rules with no interactions among them.

17 Claims, 4 Drawing Sheets

(56) References Cited

U.S. PATENT DOCUMENTS

| | | |
|---|---|---|
| 8,161,151 B2 | 4/2012 | Schindler et al. |
| 8,478,707 B1 * | 7/2013 | Ong et al. ................. 706/47 |
| 2004/0202186 A1 * | 10/2004 | Kimura et al. .......... 370/395.65 |
| 2005/0130645 A1 | 6/2005 | Dobson et al. |
| 2007/0121632 A1 * | 5/2007 | Zabarski ................. 370/392 |
| 2009/0262741 A1 * | 10/2009 | Jungck et al. ............. 370/392 |
| 2013/0230047 A1 * | 9/2013 | Subrahmaniam et al. ... 370/392 |
| 2014/0079070 A1 * | 3/2014 | Sonoda et al. ............. 370/392 |
| 2014/0247714 A1 * | 9/2014 | Sonoda et al. ............. 370/230 |

\* cited by examiner

METHOD AND SYSTEM FOR DETERMINING NETWORK-WIDE INTERACTIONS BETWEEN FORWARDING ELEMENTS IN A NETWORK

The present invention relates to a method for detecting interactions on a forwarding element in a network, wherein the forwarding element is operable to forward data according to rules installable on the forwarding element, and wherein a rule set is installed on the forwarding element, and wherein the rule set comprises rules, and wherein a rule comprises a match set and at least a corresponding action set, wherein the match set comprises at least one match field and wherein the action set comprises one or more actions wherein an action set is performed when matching a match set and wherein a rule priority is assigned to each rule.

The present invention relates also to a method for detecting neighbor interactions between neighboring forwarding elements in a network.

The present invention further relates to a method for determining network-wide interactions between forwarding elements in a network.

Even further the present invention relates to a system for determining network-wide interactions between forwarding elements in a network.

Although applicable to forwarding elements and networks in general, the present invention will be described with regard to OpenFlow based networks comprising OpenFlow-enabled switches as forwarding elements.

BACKGROUND OF THE INVENTION

In OpenFlow based networks each OpenFlow-enabled switch is configured to act according to so called OpenFlow rules OFR, installed by means of a OpenFlow protocol. Such an OpenFlow rule is defined by a match set, an action set and a rule priority. The match set defines to which network flows the action set is applied. The action set defines elaborations and forwarding decisions for incoming flows matching all the conditions in the match set. The rule priority is used to order a rule relatively to other rules installed in the Open-Flow switch. The network behavior is then defined by the combination of all rules installed at all OpenFlow-enabled switches and the topology of the network, i.e. the shape of the OpenFlow switches physical interconnections.

For example when an OpenFlow rule in a given Open-Flow switch is installed it may interact with a number of other rules installed in other OpenFlow switches depending on the network topology. A rule installed in an OpenFlow switch can make useless other rules installed in other OpenFlow switches along a certain network path. The presence or absence of such interactions between rules on different OpenFlow switches influences the behavior of the network in general. For example interactions may generate wrong behavior in the network. Such rule interactions are very difficult to detect since the total number of rules involved in an OpenFlow network, in particular in a big network, and the number of resulting possibilities of combining them according to the network topology is huge.

To help to define or program OpenFlow rules the language, called "Frenetic" may be used, which is a high level language based on functional programming paradigm. After programming the OpenFlow rules on the high level the rules are translated into a set of lower level packet processing rules, however, they are limited to a single OpenFlow switch. Interactions among the rules are solved on the high language level.

However, this has the disadvantage that once an Open-Flow switch has been provided with rules any amendment of the rules like port changing of forwarding rules, etc. may result in further interactions which cannot be solved anymore, if for example a decompiler is not present or another user does not have any tool for decompiling the installed rules in the Frenetic language.

It is therefore an objective of the present invention to provide methods and systems for determining network-wide interactions between forwarding elements.

It is a further objective of the present invention to provide a method and a system for detecting interactions on a single forwarding element It is an even further objective of the present invention to provide a method and a system for detecting interactions in a network which are more flexible.

It is a further objective of the present invention to provide methods and a system for detecting network-wide interactions between forwarding elements in a network which are easy to implement while being reliable.

It is an even further objective of the present invention to provide methods and a system which reduce network resource consumption, in particular memory in the forwarding elements as well as processing load on the forwarding elements.

It is an even further objective of the present invention to enable analyzing of network-wide interactions.

It is an even further objective of the present invention to classify interacting rules.

SUMMARY OF THE INVENTION

The aforementioned objectives are accomplished by a method of claim 1, a method of claim 7, a method of claim 11 and a system of claim 17.

In claim 1 a method for detecting interaction on a forwarding element in a network is defined, wherein the forwarding element is operable to forward data according to rules installable on the forwarding element, and wherein a rule set is installed on the forwarding element, and wherein the rule set comprises rules, and wherein a rule comprises a match set and at least a corresponding action set, wherein the match set comprises at least one match field and wherein the action set comprises one or more actions wherein an action is to be performed when matching a match set and wherein a rule priority is assigned to each rule.

According to claim 1 the method is characterized by the steps of a) Determining one or more relations between the match sets,
b) Determining one or more relations between the action sets,
c) Determining one or more interactions between the rules based on the determined relations between the match sets and the action sets, wherein each rule is tested against another rule for determining the interaction,
d) Reducing the rule set to an actual rule set according to the determined interactions so that the actual rule set comprises only rules with no interactions among them.

In claim 7 a method for detecting neighbor interactions between neighboring forwarding elements in a network is defined.

According to claim 7 the method is characterized by the steps of
a1) Selecting one of the forwarding elements as reference for determining neighbor forwarding elements, b1) Determining a neighbor list based on the forwarding elements directly connected to the selected forwarding element, c1) Performing the method according to one of the claim 1-6 for each of the forwarding elements in the neighbor list for obtaining an actual rule set for each of the forwarding elements, d1) Determining one or more interactions between the actual rule sets of two neighboring forwarding elements, e1) Reducing the actual rules sets according to the determined interactions so that the actual rules sets comprise only rules with no interactions to a rule of the respective other actual rule set.

In claim 11 a method for determining network-wide interactions between forwarding elements in a network is defined.

According to claim 11 the method is characterized by the steps of a2) Performing for each forwarding element in the network the method according to one of the claims 1-6, b2) Selecting one of the forwarding elements, c2) Determining a neighbor list of next neighbors with regard to the selected forwarding element, d2) Performing the steps c1)-e1) of the method according to one of the claims 7-10, e2) Merging the disjoint actual rule sets to one new actual rule set representing both the neighbor forwarding element and the selected forwarding element, f2) Defining a merged forwarding element with the new actual rule set as new selected forwarding element, g2) Performing the steps c2)-f2) iteratively until a predetermined number, preferably all forwarding elements in the network have been merged to two forwarding elements.

In claim 17 a system for determining network-wide interactions between forwarding elements in a network is defined.

According to claim 17 the system is characterized by reducing means, preferably the forwarding element itself and/or a centralized controller in the network, is operable to perform the method according to one of the claims 1-6 on the forwarding element, determining means operable to select one of the forwarding elements and to determine a neighbor list of next neighbors with regard to the selected forwarding element, reducing means operable to perform the steps c1)-e1) of the method according to one of the claims 7-10, merging means operable to merge the disjoint actual rule sets to one new actual rule set representing both the neighbor forwarding element and the selected forwarding element and to define a merged forwarding element with the new actual rule set as new selected forwarding element, iteration means operable to perform the steps c2)-g2) of the method according to one of the claims 11-16 iteratively until a predetermined number, preferably all forwarding elements in the network have been merged to two forwarding elements.

According to the invention it has been recognized that interacting of rules can be detected from a network-wide perspective.

According to the invention it has been further recognized that a simplification of a network analysis is provided, in particular due to the network transformations in form of merging and/or reducing of forwarding elements According to the invention it has been further recognized that due to the network transformations run time operation optimizations are enabled.

According to the invention it has been further recognized that network resource consumption is optimized, for example saving forwarding bandwidth on links, flow table space and CPU load on forwarding elements, preferably switches.

According to the invention it has been further recognized that interactions can be made visible in the forwarding elements, for example in the flow tables in order to enable a check of competing controller functions or the controller implementation.

According to the invention it has been further recognized that in a very flexible way interactions respectively interacting rules can be determined automatically and continuously and may be applied at different operational domains without involving any modification to the respective controllers of such domains.

Further features, advantages and preferred embodiments are described in the following subclaims.

According to a preferred embodiment duplication, redundancy, generalization, shadowing, correlation, inclusion and/or extension as rule interactions are determined. This enables a complete and reliable definition of interactions between two rules. For example a rule Rx with a match set Mx and action set Ax and a rule Ry with match set My and action set Ay and assuming that the priority of the rule Rx is always lower then the priority of rule Ry then Rx can be involved in the following interactions:

Duplication: Assuming that the priorities of two rules are the same, they are duplicated if they are exactly equal also in any other part of the rule, i.e., match set and action set.

Redundancy: Redundant rules have the same effects on the subset of flows matched by both rules, hence, in some conditions (e.g., no interactions with third rules), depending on the rules priorities, one of the rules could be deleted without affecting the data-path behavior.

Generalization: Rules have different actions, but Rx matches a superset of the flows matched by Ry. So, action set Ay will be applied to flows matched by the intersection of Mx with My, while to the flows matched by the difference between Mx and My, the action set Ax will be applied.

Shadowing: If Rx is shadowed by Ry, then Rx is never applied, since all the flows are matched by Ry before that Rx is examined.

Correlation: The two rules have different match sets, but the intersection of these match sets is not void, so, to flows that are in the intersection only the higher priority rule's action set will be applied. Note that this interaction is different from the shadowing interactions, since for some flows the rule is still applied.

Inclusion: Inclusion interaction is similar to shadowing. This interaction is raised up in the case a rule is never applied "as is", but its actions are still applied in combination with the actions of another rule (of higher priority). E.g., Rx is never applied, but, since the action set of Rx is a subset of the action set of Ry, the actions of Rx are still applied, but only in combination with the actions of Ry.

Extension: Extension interaction is similar to generalization. A rule with lower priority is extending the action set applied by another rule, adding more actions. Only to the flows matched by the difference between Mx and My the extended actions are applied.

According to a further preferred embodiment match field relations are classified into disjoint, equal, subset, superset and/or correlated relation. This enables even in the presence of wildcards a complete description of relations between different match fields. The relation between a match field f0 and a match field f1 can be one of the following:

disjoint: match fields have different values;
equal: $f_0$ value is the same as $f_1$;
subset: $f_0$ value is a subset of the value of $f_1$ (E.g, $f_0$ has a defined value, while $f_1$ value is a wildcard).
superset: $f_0$ value is a superset of the value of $f_1$ (E.g., $f_0$ value is an IP-address in the form 192.168.0.0/16, while $f_1$ value is 192.168.1.0/24.
Overlapping: $f_0$ and $f_1$ overlap, but do not fall into the superset/subset categories (E.g., $f_0$ contains all IP addresses 128.0.0.0/1, while $f_1$ contains all IP addresses with the least significant bit==1).

According to a further preferred embodiment match set relations are classified into a disjoint, exactly matching, subset, superset and/or correlated relation. This enables a complete description of relations between two different match sets. For example the relation between a match $M_0$ and a match set $M_1$ can be then one of the following:

Disjoint: $M_0$ and $M_1$ are disjoint, if every field in $M_0$ is disjoint with the correspondent field in $M_1$;
Exactly matching: $M_0$ and $M_1$ are exactly matching if every field in $M_0$ is equal to the correspondent field in $M_1$;
Subset: $M_0$ is a subset of $M_1$ if at least one field of $M_0$ is a subset of the correspondent field of $M_1$ and the other fields in $M_0$ are equal to the correspondent fields in $M_1$;
Superset: $M_0$ is a superset of $M_1$ if at least one field of $M_0$ is superset of the correspondent field of $M_1$ and the other fields in $M_0$ are equal to the correspondent fields in $M_1$;
Correlated: At is correlated with $M_1$ if one or more fields of $M_0$ are superset of the correspondent fields of $M_1$ and the other fields in $M_0$ are equal or subset of the correspondent fields in $M_1$.

According to a further preferred embodiment action set relations are classified into a disjoint, related, subset, superset and/or equal relation. This enables a complete description of interactions between two action sets. Therefore the relation of the action set A0 and action set A1 can be one of the following:

Disjoint: A0 is disjoint from A1 if for any action in A0, there is no correspondent action in A1;
Related: A0 is related to A1 if there is at least one action from A0 that is related to an action of A1;
Subset: A0 is a subset of A1 if all the actions contained in A0 are equal to actions contained in A1, and the number of actions in A1 is greater than the number of actions in A0;
Superset: A0 is a superset of A1 if all the actions contained in A0 are equal to actions contained in A1, and the number of actions in A0 is greater than the number of actions in A1;
Equal: A0 is equal to A1 if all the actions contained in A0 are equal to actions contained in A1, and the number of actions in A0 is equal to the number of actions in A1.

An action set may contain zero or more actions. Typical actions are for example "forward to port X", "rewrite network source/destination address", "pop/push VLAN tag" or the like. An action set may contain only one occurrence of a given action, for example an action set may not contain two times a "forward to the same port" action. An action a0 may be equal to an action a1 only if they are of the same type and have the same values. If the type is the same but values are different then the actions a0, a1 are related. An action a0 is different from an action a1 if their types are different.

According to a further preferred embodiment step d) is performed by performing the substeps of da) Deleting all rules classified as duplication, shadowed and inclusion,
db) Iteratively build the actual rule set wherein the number of iterations is the number of rules in the rule set to be reduced and wherein match fields are reduced depending on the relation between a match field of a rule with a higher priority and a match field of another rule.

This enables a fast and reliable as well as easy-to-implement reduction of a rule set to an actual rule set. For example an actual rule set ARS is a rule set for which the following property is valid:

$$\forall i,j\ M_i \neq M_j\colon M_i \in R_i\colon M_i \in R_j\colon R_i, R_j \in ARS$$

In an actual rule set there are no interactions among different rules R and it is possible to look at one rule to understand the behavior of the corresponding network flow. For example the steps da) and db) are performed in the following way: First a rule set reduction according to step da) is performed by deleting from the rule set any duplicated, shadowed or included rule. Then iteratively a rule set $RS_{j+1}$ is built: First the higher priority rule $R_h$ in $RS_j$ is selected and then for each $R_i$ in $RS_j$ the following action is performed:

$$RS_{j+1} = RS_j - (P_h) - (R_i) + (R_j^j)$$

$$ARS = ARS + (R_h)$$

$$M_h \subset M_i \rightarrow R_i^j: (M_i - M_h): A_i$$

$$M_h \supset M_i \rightarrow R_i^j: \text{deleted}$$

$$M_h = M_i \rightarrow R_i^j: \text{deleted}$$

$$M_h \sim M_i \rightarrow R_i^j: (M_i - (M_h \cap M_i)): A_i$$

$$M_h \neq M_i \rightarrow R_i^j: R_i$$

The actual rule set ARS is built after N iterations of the step db) where N is the number of rules in the rule set RS. Preferably a negation in match set definitions may be enabled in order to describe in detail the subset of matched flows.

According to a preferred embodiment of the method according to claim 7 rules of an actual rule set are splitted with respect to an ingress port of a forwarding element. This enables a fast processing of the rules for determining the one or more interactions respectively reduction of the actual rule set according to step e1).

According to a further preferred embodiment the actual rule set of the selected forwarding element comprises all forwarding rules to a neighbor forwarding element, interactions are determined between the actual rule set and the actual rule set of the neighbor forwarding element and then interactions within the actual rule set of the selected forwarding element are checked with regard to ports, preferably wherein for shadowing interactions a separate potential shadow list is determined and the potential shadow list is separately reduced by removing all rules which are not shadowed. This enables in a fast and reliable way to perform the steps c1)-e1).

According to a further preferred embodiment in step d1) match set transformations are checked. This enables that packet transformations, in particular header rewriting functions may be taken into account, thus enhancing the flexibility.

According to a further preferred embodiment rules are installed in a forwarding element by a centralized controller, preferably wherein the controller performs caching of the rules installed on the forwarding elements. In particular by caching rules consistency of the snapshot of the rules installed at the forwarding elements is ensured by the centralized controller, i.e. the controller has the knowledge of rules installed at all forwarding elements in the network.

According to a further preferred embodiment for merging ports of the forwarding elements forwarding element identification information are added. This enables in an easy-to-implement way to distinguish between different ports on different switches therefore allowing a fast merging of actual rule sets.

According to a further preferred embodiment for merging actions at least two actions are combined to a single action set based on a network topology. This enables to combine actions with respect to the network topology, thus enabling a reliable combing of the two action sets.

According to a further preferred embodiment combining performed by putting the actions into a appearance order in the network. This enables for example that actions of a rule coming from a first forwarding element are applied before rules of a second forwarding element. In case of conflict it may be resolved based on the conflicting actions: it is always applied the "last" set action. For example in the direction from a first forwarding element to a second forwarding element the action of a rule coming from the second forwarding element is applied. Further in case of a drop action and a forwarding action the drop action has always the precedence and in case of forwarding actions the "last" set action is always applied. For example in the direction of first forwarding element to a second forwarding element the action of the rule coming from the second forwarding element is applied first. Of course more than one link (from a first forwarding element to a second forwarding element) is possible.

According to a further preferred embodiment determined interactions are announced in at least a part of the network, preferable to a centralized controller.

This enables for example a network administrator to analyze if the network behavior is the expected one. Further an interaction may be highlighted after the interactions have been detected after a predefined number of runs. Even further assuming a plurality of controllers for different administrative domains, interactions for each domain may be determined by each controller and further the methods can also be used to detect interactions among independently working controllers.

BRIEF DESCRIPTION OF THE DRAWINGS

There are several ways how to design and further develop the teaching of the present invention in an advantageous way. To this end it is to be referred to the patent claims subordinate to patent claim 1, patent claim 7, patent claim 11 and patent claim 17 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawings

DETAILED DESCRIPTION OF THE PREFERRED EMBODIMENTS

Figure 1:
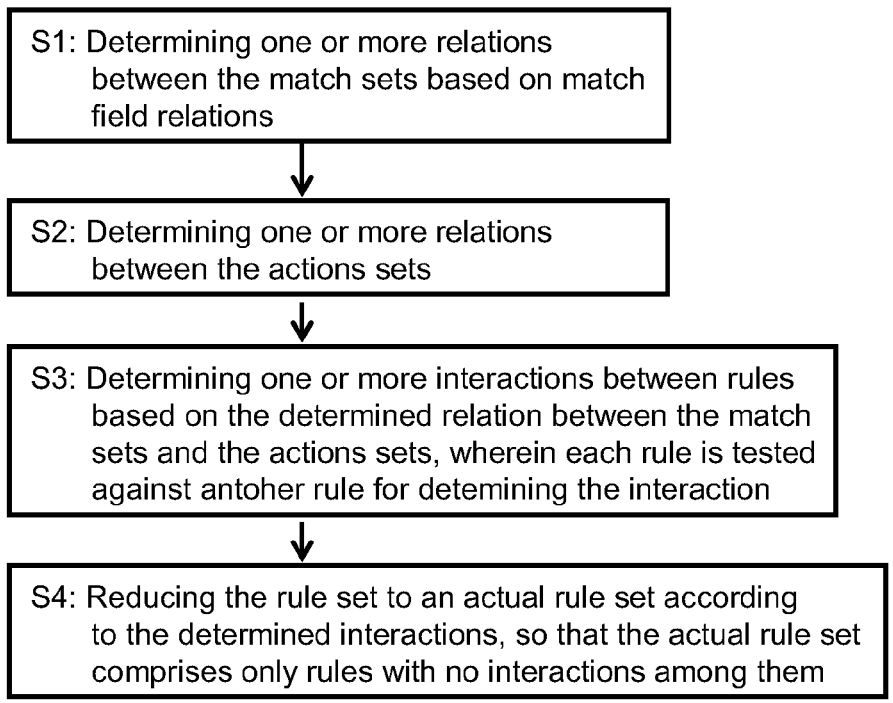
FIG. 1 shows a flow diagram for a method according to a first embodiment of the present invention.

FIG. 1 shows a flow diagram for a method according to a first embodiment of the present invention In FIG. 1 a flow chart for method for detecting interactions on the forwarding element in the network is shown, wherein the forwarding element is operable to forward data according to rules, installable on the forwarding element and wherein the rule set comprises a match set and at least corresponding action set, wherein the match set comprises at least one match field and wherein the action set comprises one or more actions wherein action set to be performed when matching a match field and a priority assigned to each rule.

In a first step S1 one or more relations between the match sets based on match field relations are determined.

In a second step S2 one or more relations between the actions sets are determined.

In a third steps S3 one or more interactions are determined between rules based on the determined relation between the match sets and the action sets, wherein each rule is tested against another rule for determining the interaction.

In a fourth step S4 the rule set is reduced to an actual rule set according to the determined interactions so that the actual rule set comprise only rules with no interactions among them.

To detect interactions on a single forwarding element two auxiliary procedures defined the match set relations and actions that relations are performed. If for example two rules $R_x$ and $R_y$, and assuming that the priority of the rule $R_x$ is smaller or equal than the priority of Rule $R_y$, i.e. priority $(R_x) \leq$ priority$(R_y)$ then first the procedure matchset_relation $(R_x; R_y)$ is performed and then the procedure actionset_relation $(R_x; R_y)$. To detect the interaction between the two rules $R_x$ and $R_y$ the above described procedures are performed: the matchset relation procedure is performed for example in the following way:

---

Algorithm 1 matchset_relation $(R_x, R_y)$

---

```
relation ← undetermined
field_relations ← compare_fields(R_x, R_y)
for field in match_fields do
    if field_relations [field] = equal then
        if relation = undetermined then
            relation ← exact
        end if
    else if field_relations [field] = superset then
        if relation = subset or relation = correlated then
            relation ← correlated
        else if relation ≠ disjoint then
            relation ← superset
        end if
    else if field_relations [field] = subset then
        if relation = superset or relation = correlated then
            relation ← correlated
        else if relation ≠ disjoint then
            relation ← subset
        end if
```

```
Algorithm 1 matchset_relation (R_x, R_y)

else
            relation ← disjoint
        end if
    end for
    return relation
```

To find the interaction the following procedure may be performed:

```
Algorithm 2 anomaly_detection (R_x, R_y)

anomaly ← None
    ms_relation ← matchset_relation (R_x, R_y)
    as_relation ← actionset_relation(R_x, R_y)
    if priority(R_x) = priority(R_y) and ms_relation =
    exact and as_relation = equal then
        anomaly ← duplication
    else if ms_relation ≠ disjoint then
        if ms_relation = correlated then
            if as_relation = equal then
                anomaly ← redundancy
            else
                anomaly ← correlation
            end if
        else if ms_relation = superset then
            if as_relation = equal then
                anomaly ← redundancy
            else if as_relation = superset then
                anomaly ← extension
            else
                anomaly ← generalization
            end if
        else if ms_relation = exact then
            if as_relation = equal then
                anomaly ← redundancy
            else if as_relation = subset then
                anomaly ← inclusion
            else
                anomaly ← shadowing
            end if
        else if ms_relation = subset then
            if as_relation = equal then
                anomaly ← redundancy
            else if as_relation = subset then
                anomaly ← inclusion
            else
                anomaly ← shadowing
            end if
        end if
    end if
    return anomaly
``` wherein anomaly is the type of interaction.

Figure 2:
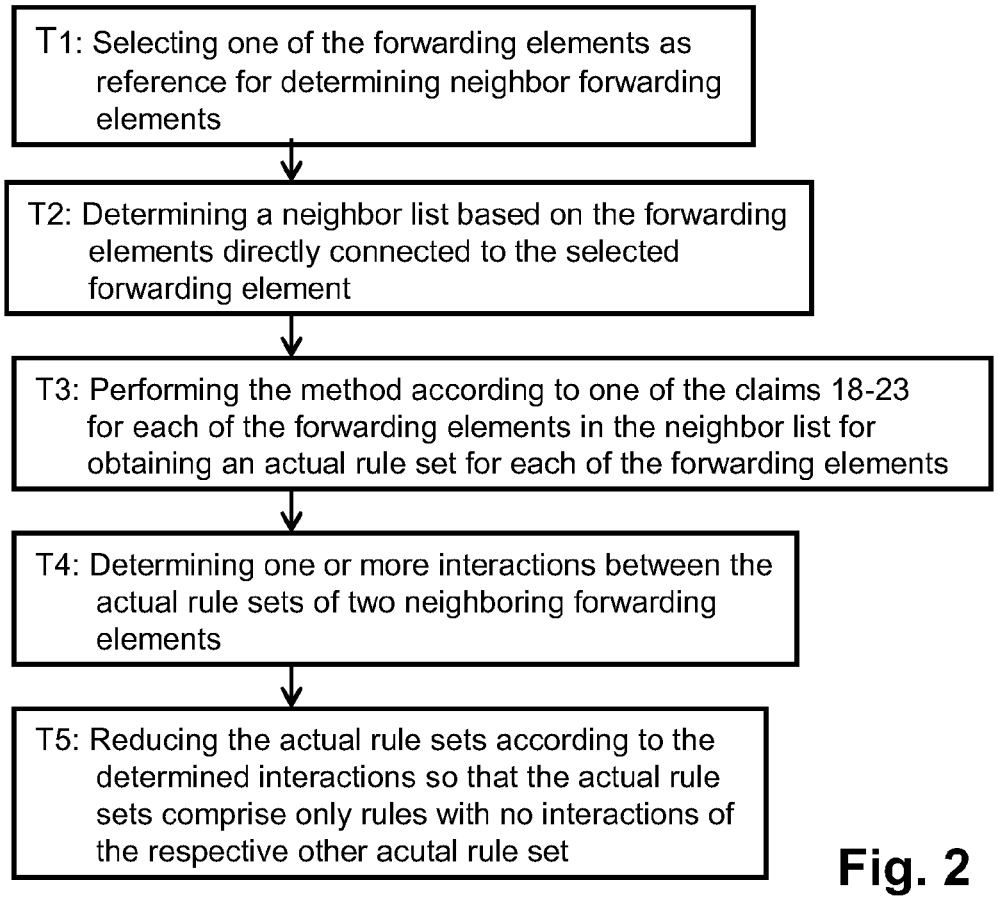
FIG. 2 shows a flow diagram of the method according to a second embodiment of the present invention.

FIG. 2 shows a flow diagram of the method according to a second embodiment of the present invention.

In FIG. 2 a method for detecting neighbor interactions between neighboring forwarding elements in a network are shown in form of a flow diagram.

In a first step T1 one of the forwarding elements selected as reference for determining neighbor forwarding elements.

In a second step T2 a neighbor list is determined based on the forwarding elements directly connected to the selected forwarding element.

In a third step T3 the method according to one of the claims 1 to 6 is performed for each of the forwarding elements in the neighbor list for obtaining an actual rule set for each of the forwarding element.

In a fourth step T4 one or more interactions are determined between the actual rule sets of two neighboring forwarding elements and in a fifth step T5 the actual rule sets are reduced according to the determined interactions so that the actual rule sets comprise only rules with no interactions of the respective other actual rule set.

When two forwarding elements $\alpha$, $\sigma$ are considered to be directly connected by a link then the interactions among the forwarding elements $\alpha$, $\sigma$ are defined by looking at the actual rule set $ARS^\alpha$ against $ARS^\sigma$. In particular the following interactions are defined in the $\sigma \rightarrow \alpha$ direction, hence the subset of rules from $ARS^\sigma$ containing an action that forwards packets to the forwarding element $\alpha$ is determined. Further in the following subset $ARS^{\sigma x}$ is defined since the packets are directed to the forwarding element $\alpha$ if they are forwarded by the port x of the forwarding element $\sigma$. Further a subset of the actual rule set of the forwarding element $\alpha$ $ARS^\alpha_y$ is meant to be a subset of rules from $ARS^\alpha$ that is applied to the only port y of the forwarding element $\alpha$. Then the following interactions are possible:

| Procrastination | |
|---|---|
| $M_i^\sigma = M_j^\alpha$ | $[drop] \in A_j^\alpha$ |
| $M_i^\sigma \subset M_j^\alpha$ | $[drop] \in A_j^\alpha$ |
| $M_i^\sigma \supset M_j^\alpha$ | $[drop] \in A_j^\alpha$ |
| $M_i^\sigma \sim M_j^\alpha$ | $[drop] \in A_j^\alpha$ |
| Shadowing | |
| $M_j^\alpha \neq M_i^\sigma; \forall i$ | no conditions |
| $M_j^\alpha \supset M_i^\sigma$ and $\{M_j^\alpha - M_i^\sigma\} \neq M_k^\sigma; \forall k \neq i$ | no conditions |
| $M_j^\alpha \sim M_i^\sigma$ and $\{M_j^\alpha - (M_i^\sigma \cap M_j^\alpha)\} \neq M_k^\sigma; \forall k \neq i$ | no conditions |
| Knotting | |
| $M_i^\sigma = M_j^\alpha$ | $\exists$ port $z \in \alpha$, connected to $\sigma$: [forward to z] $\in A_j^\alpha$ |
| $M_i^\sigma \subset M_j^\alpha$ | $\exists$ port $z \in \alpha$, connected to $\sigma$: [forward to z] $\in A_j^\alpha$ |
| $M_i^\sigma \supset M_j^\alpha$ | $\exists$ port $z \in \alpha$, connected to $\sigma$: [forward to z] $\in A_j^\alpha$ |
| $M_i^\sigma \sim M_j^\alpha$ | $\exists$ port $z \in \alpha$, connected to $\sigma$: [forward to z] $\in A_j^\alpha$ |

It has to be noted that the same rule can actually generate more than one interaction with other rules of forwarding elements.

Figure 3:
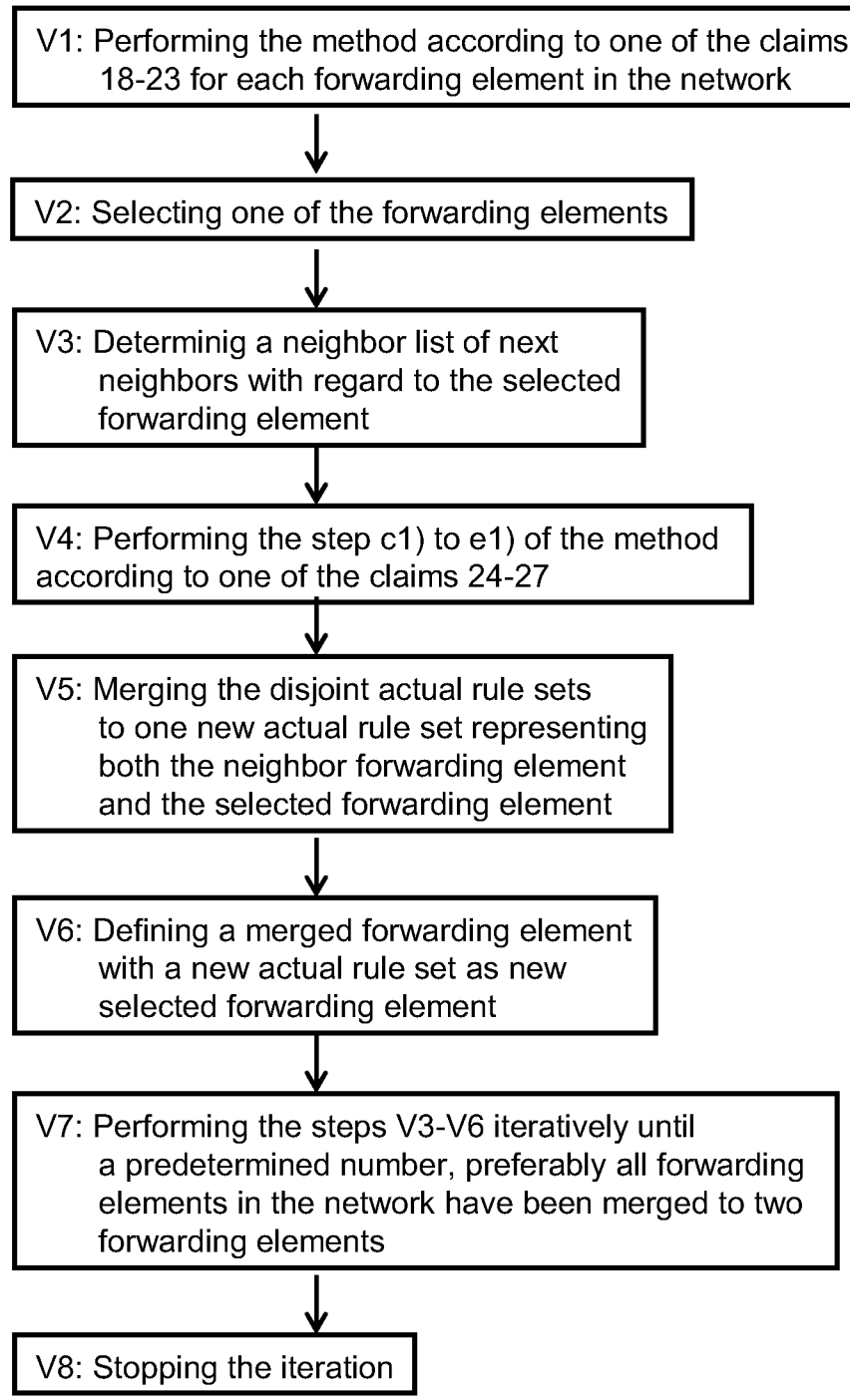
FIG. 3 shows a flow diagram according to a third embodiment of the present invention.

FIG. 3 shows a flow diagram according to a third embodiment of the present invention.

In FIG. 3 a flow chart for a method for determining network-wide interactions between forwarding elements in a network is shown.

In a first step V1 for each forwarding element in the network the method is performed according to one of the claims 1 to 6.

In a second step V2 one of the forwarding elements is selected.

In a third step V3 a neighbor list of next neighbors with regard to the selected forwarding element is determined.

In a fourth step V4 the steps c1) to e1) of the method according to one of the claims 7 to 10 is performed.

In a fifth step V5 the disjoint actual rule sets are merged to one new actual rule set representing both the neighbor forwarding element and the selected forwarding element.

In a sixth step V6 a merged forwarding element is defined with a new actual rule set as new selected forwarding element and in a seventh step V7 the steps c2) to f2) are performed iteratively until a predetermined number, preferably all forwarding elements in the network, have been merged to two forwarding elements.

In a eighth step V8 the iteration is stopped and the iterations may be announced to a controller in the network.

Figure 4:
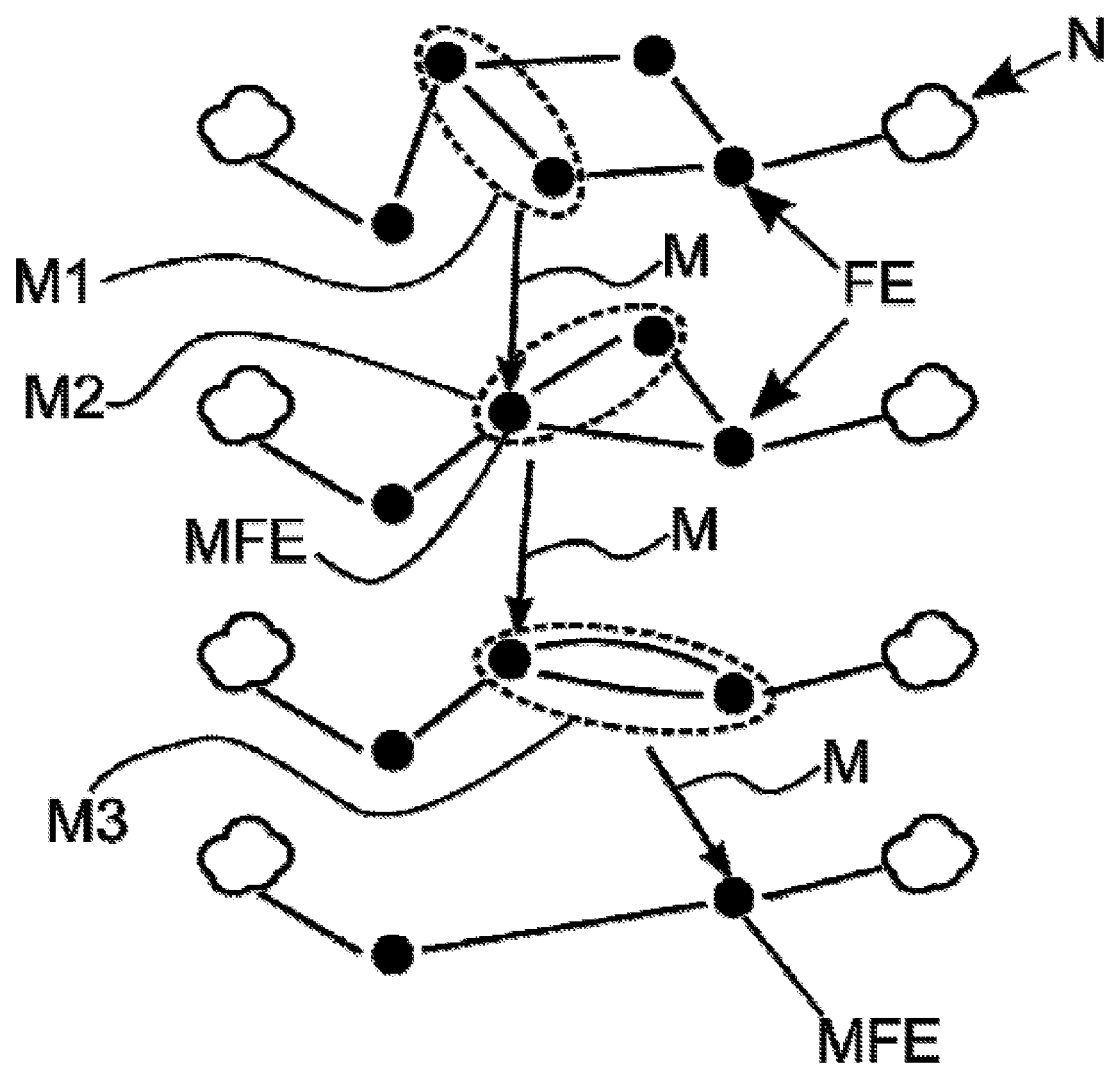
FIG. 4 shows part of a method according to a fourth embodiment of the present invention and FIG. 5 shows part of a method according to a fifth embodiment of the present invention.

FIG. 4 shows part of a method according to a fourth embodiment of the present invention In FIG. 4 different steps of merging forwarding elements comprising rule sets are shown. In FIG. 4 a network N has a number of forwarding elements FE. Further the dotted ellipse M1 shows—beginning from the top of FIG. 4—two forwarding elements to be merged by a merging procedure M. This results in a merged forwarding element MFE. This merged forwarding element MFE comprises rule sets of the two merged forwarding elements FE. The merged forwarding element MFE is then combined (denoted with reference sign M2) with a further forwarding element FE in a further merging operation M. This is performed as long as only two forwarding elements remain. The merge procedure M is used to transform two directly connected forwarding elements into one forwarding element. After a merging step the new network topology has one node/forwarding element FE less than the original network topology and the number of edges is reduced by the number of edges connected to the merged forwarding element. By applying the merging procedure M n-times this corresponds to an n-hop interaction.

The merging procedure M performs two directly connected forwarding elements preferably OpenFlow switches into a single forwarding element, preferably a single OpenFlow switch. The merging procedure M is performed both from the network topology and rule set perspective: in the following two OpenFlow switches, denoted with $\alpha$ and $\sigma$ are assumed to be directly connected by a link. The corresponding ports with which they are connected are denoted with x and y. To apply a merging of the two OpenFlow switches the following steps are performed:

Actualize rule sets RS by reducing them to actual rule sets ARS: apply $RS^\alpha \to ARS^\alpha$ and $RS^\alpha \to ARS^\alpha$;

ARSs reduction: detect neighbor interactions for $ARS^\alpha$ and $ARS^\sigma$ and delete all shadowed rules;

Switches ports renaming: rename switches port from <port_id> to <switch_id>.<port_id> in both $ARS^\alpha$ and $ARS^\sigma$;

Unchanged rules adding: Build $ARS^{\alpha\sigma}=\{ARS^\alpha - ARS^{\alpha,y}\} \cup \{ARS^e - ARS^{z,x}\}$ For each rule $R_i \in ARS^{\alpha x}$:
  For each rule $R_x \in [ARS_{ALL}^\alpha, ARS_y^\alpha]$:
    do:
      If $M_i - M_k = M$ then do nothing;
      else $ARS^{\alpha\sigma}=\lfloor ARS^{\alpha\alpha} \rfloor ÅR^i$ where it $R^i$: $\{M_i - M_k\}$, select $(A_i, A_k)$; $M_i = M_i - M_k$;
    while $M_i$ is not $\phi$ or no more rules in $[ARS_{ALL}^x, ARS_z^x]$:
For each rule $R_i \in ARS^{\alpha x}$:
  For each rule $R_k \in [ARS_{ALL}^\sigma, ARS_x^\alpha]$:
    do:
      If $M_i - M_k = M$ then do nothing;
      else $ARS^{\alpha\sigma}=\{ARS^{\alpha\sigma}\} \cup R^i$ where $R^i$: $[M_i - M_k]$, select $(A_i, A_k)$; $M_i = M_i - M_k$;
    while $M_i$ is not $\phi$ or no more rules in $\{ARS_{ALL}^\alpha, ARS_\alpha^\sigma\}$:

Further, "ALL" with regard to port is used as a port meaning that the rule is applied to all the corresponding ports of a forwarding element The procedure select $(A_i, A_K)$ is used in order to set the action for the rules generated for $ARS^{\alpha\sigma}$. The select-procedure combines the action of the two actions sets, building an action set that is the combination of such actions. Actions are combined by putting them in the order in which they appear based on the network topology, for example if the $\sigma \to \alpha$ direction actions of the rule coming from $\sigma$ are applied before. In case of conflict, it is resolved based on the conflicting actions:

set actions→always apply the "last" set action, e.g., in the $\sigma \to \alpha$ direction, apply the action of the rule coming from a drop action and forward action→drop has always the precedence forward actions→always apply the "last" set action, e.g., in the $\sigma \to \alpha$ direction, apply the action of the rule coming from $\alpha$ The presented algorithm can be easily extended to a more general case where more than one link is in place among the forwarding elements.

Figure 5:
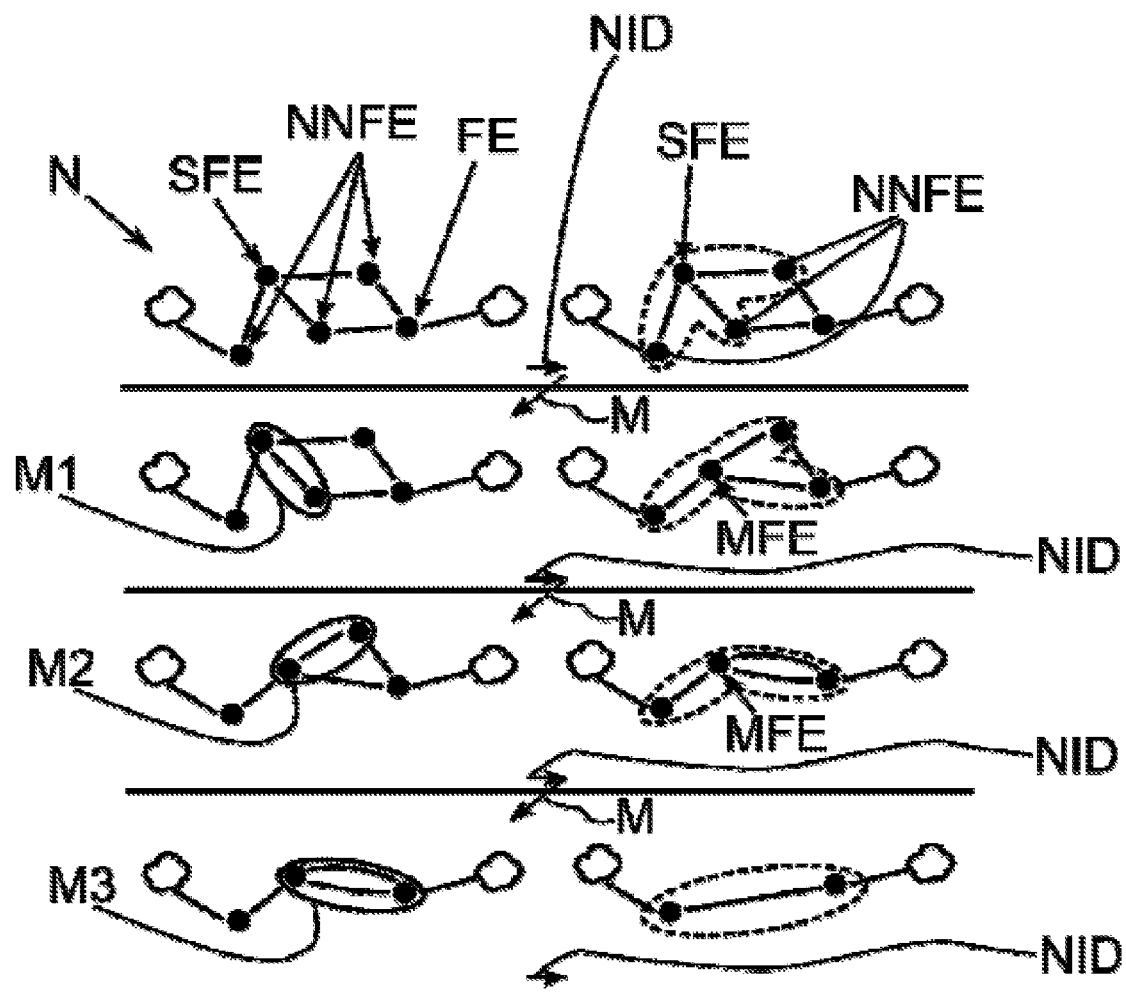

FIG. 5 shows part of a method according to a fifth embodiment of the present invention.

In FIG. 5 steps are shown for detecting network-wide interactions. First in a network N1 comprising forwarding elements FE, a forwarding element is selected denoted with reference sign SFE. Then with regard to the selected forwarding element SFE the neighbors, i.e. the next neighbor forwarding elements NNFE are determined. Then interactions between the next neighbor forwarding elements NNFE are detected (reference sign NID) and preferably randomly one of these next neighbor forwarding elements NNFE is selected to be merged with the previously selected forwarding element SFE. The merging procedure M is applied and the forwarding elements FE in the ellipse M1 are merged. Then beginning from the merged forwarding element MFE the interactions to the next neighbor forwarding elements NNFE are detected (reference sign NID) and randomly a next neighbor forwarding element NNFE is selected for merging. Then the merging procedure M is applied again to the two forwarding elements FE in the ellipse M2. This is performed iteratively until only two forwarding elements remain (see on the bottom on the right of FIG. 5)

Therefore, network-wide interactions can be detected by combining the interactions between the next neighbors and a merge procedure. The procedure starts from the forwarding element for which rule interactions are detected and then interaction to the neighbors are detected. Then one of the neighbor forwarding elements is selected, preferably randomly and merged with the previous forwarding element. Then with respect to the merged forwarding element the forwarding element interactions to next neighbors are determined again for detecting the interactions and so on. This provides a network which is transformed into a network with a two forwarding element topology The present invention can be particularly used for OpenFlow network programming and analysis and management of forwarding elements, preferably OpenFlow switches and their optimization. Further the present invention may be used as a debug tool: when developing an application, preferably an OpenFlow application, algorithms can be used to verify the interaction among rules which are installed in the corresponding OpenFlow switches. For example it can point any overhead in the developed application or unexpected rule interaction may be detected that predict a wrong handling of some traffic flows, for example loops or the like.

The present invention may be used with a so-called advance controller: the present invention may be integrated in an advanced controller as a mean to analyze rules in order to provide some forms of automation in rules management, for example rejecting duplicated rules, reordering rule priorities to avoid shadowing, rule splitting to avoid redundancy and correlation, rules modification to avoid procrastination, etc. In particular the present invention may be used in a network operating system. Since for example the network operating system may include a runtime environment being able to translate high level inputs coming from several applications into lower level flow table entries the present invention may be applied to perform different optimizations. In particular, optimizations can be used to reduce resource consumption in the network, for example forwarding bandwidth on links, flow table space, CPU load on the corresponding switches or the like.

Further, the present invention may be used when the network is controlled by several controllers operated by different administrative domains. For example OpenFlow controllers are developed separately and their interactions cannot be planned in advance. Assuming that according to some policies the administrative domains accept to share part of their knowledge of their networks, the present invention may be used to detect interactions among the independently working controllers. The automation of the interaction detection enable the administrative operators the fast react to any update of the controllers out of their network in case such updates are modifying the behavior of their network with potentially conflicting rules. Even further, the present invention may be used to determine cross-domain network interactions since being able to highlight the interactions of two independently managed networks, preferably OpenFlow networks.

In summary the present invention enables the definition of network transformation and analysis procedures to provide runtime operation optimizations. The present inventions further enables the detection of interacting rules, preferably OpenFlow rules from a network-wide perspective and enables the definition of network transformation procedures for simplifying network analysis.

The present invention further enables an optimization of network resource consumption, for example by saving forwarding bandwidth on links, flow table space and CPU load on the forwarding elements. The present invention allows interactions to be made visible in the forwarding elements, preferably in the network switches flow tables in order to allow the check a controller implementation or competing controller functions. Even further the present invention allows a classification of interacting rules to see the degree of severity. For example a procrastination interaction can point out a waste of bandwidth.

Further the present invention enables an automated discovery of interacting rules thereby letting a user to focus on potential problems only and not waste time on non-problematic rules. The present invention enables to detect potential rule problems continuously even before an error becomes noticeable. The present invention is easy to implement, for example may be applied for different operational domains without involving any modification to controllers of such domains.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method to be executed by a computer device for detecting interactions on a forwarding element in a network (N), wherein the forwarding element (FE) forwards data according to rules, installable on the forwarding element (FE), and wherein a rule set (RS) is installed on the forwarding element (FE), and wherein the rule set (RS) comprises rules (R), and wherein a rule comprises a match set (M) and at least a corresponding action set (A), wherein the match set (M) comprises at least one match field (f) and wherein the action set (A) comprises one or more actions (a) wherein action set (A) to be performed when matching the match set (M) and a priority (P) assigned to each rule (R), comprising the steps of:
   a) computing (S1) one or more relations between the match sets (M) based on match field relations (f),
   b) computing (S2) one or more relations between the action sets (A),
   c) computing (S3) one or more interactions between the rules (R) based on the computed relations between the match sets (M) and the action sets (A), wherein each rule (Rx) is tested against another rule (Ry) for determining the interaction, wherein all of duplication, redundancy, generalization, shadowing, correlation, inclusion, and extension as rule interactions are determined, and
   d) reducing (S4) the rule set (RS) to an actual rule set (ARS) according to the computed interactions so that the actual rule set (ARS) comprises only rules (R) with no interactions among the rules,
   wherein:
   a2) the steps a), b), c) and d) are performed (V1) for each forwarding element (FE) in the network (N),
   b2) one of the forwarding elements (FE) is selected (V2),
   c2) a neighbor list of next neighbors (NNFE) with regard to the selected forwarding element (SFE) is determined (V3),
   d2) steps c1) to e1) are performed (V4), as follows:
      c1) performing (T3) the steps a), b), c) and d) for each of the forwarding elements (NNFE) in the neighbor list for obtaining an actual rule set (ARS) for each of the forwarding elements (NNFE),
      d1) determining (T4) one or more interactions between the actual rule sets (ARS) of two neighbor forwarding elements (FE, NNFE),
      e1) reducing (T5) the actual rules sets (ARS) according to the computed interactions so that the actual rules sets (ARS) comprise only rules with no interactions to the rule (R) of the respective other actual rule set (ARS),
   e2) the disjoint actual rule sets are merged (V5) into one new actual rule set (ARS) representing both the neighbor forwarding element (NNFE) and the selected forwarding element (SFE),
   f2) a merged forwarding element (MFE) is defined (V6) with the new actual rule set (ARS) as new selected forwarding element (SFE), and
   g2) performing (V7) the steps c2) to f2) iteratively until a predetermined number have been merged to two forwarding elements (FE).

2. The method according to claim 1, wherein match field relations are classified into any of a disjoint, equal, subset, superset and overlapping relation.

3. The method according to claim 1, wherein match set relations are classified into any of a disjoint, exactly matching, subset, superset and correlated relation.

4. The method according to claim 1, wherein action set relations are classified into any of a disjoint, related, subset, superset and equal relation.

5. The method according to claim 1, wherein step d) is performed by performing the substeps
da) deleting all rules (R) classified as duplication, shadowed or inclusion, and
db) iteratively build the actual rule set (ARS) wherein the number of iterations is the number of rules (R) in the rule set (RS) to be reduced and wherein the match fields (f) are reduced depending on the relation between a match field (f) of the match fields (f) of a rule (Rx) with a higher priority and a match field (f) of another rule (Ry).

6. The method according to claim 1, wherein, along with the performing (V4) of steps c1) to e1), also performing steps a1) and b1) as follows:
a1) selecting (T1) the one of the forwarding elements (SFE) as reference for determining the neighbor forwarding elements (NNFE), and
b1) determining (T2) the neighbor list based on the forwarding elements (NNFE) directly connected to the selected forwarding element (SFE).

7. The method according to claim 6, wherein the rules of the actual rule set (ARS) are splitted with respect to an ingress port of the forwarding element (FE).

8. The method according to claim 6, wherein the actual rule set (ARS) of the selected forwarding element (SFE) comprises all forwarding rules forwarding to a neighbor forwarding element (NNFE) of the neighbor forwarding elements (NNFE), that interactions are determined between the actual rule set (ARS) and the actual rule set of the neighbor forwarding element (NNFE) of the neighbor forwarding elements (NNFE) and then interactions within the actual rule set (ARS) of the selected forwarding element (SFE) are checked with regard to ports.

9. The method according to claim 6, wherein in step d1) match set transformations are checked.

10. The method according to claim 1, wherein for merging ports of the forwarding elements (FE) are added with forwarding element identification information.

11. The method according to claim 1, wherein for merging actions of at least two action sets (A1, A2) are combined to a single action set (A) based on the network topology.

12. The method according to claim 11, wherein combining is performed by putting the actions (a) into appearance order in the network (N).

13. A system for determining network-wide interactions between forwarding elements (FE) in a network (N), comprising:
a reducing computer device performs steps for detecting interactions on a forwarding element in the network, the steps including:
a) computing (S1) one or more relations between the match sets (M) based on match field relations (f),
b) computing (S2) one or more relations between the action sets (A),
c) computing (S3) one or more interactions between the rules (R) based on the computed relations between the match sets (M) and the action sets (A), wherein each rule (Rx) is tested against another rule (Ry) for determining the interaction, wherein all of duplication, redundancy, generalization, shadowing, correlation, inclusion, and extension as rule interactions are determined, and
d) reducing (S4) the rule set (RS) to an actual rule set (ARS) according to the computed interactions so that the actual rule set (ARS) comprises only rules (R) with no interactions among the rules;
a determining device that selects one of the forwarding elements (FE) and to determine a neighbor list of next neighbors (NNFE) with regard to the selected forwarding element (SFE);
another reducing computer device that performs steps c1) to e1) as follows:
c1) performing (T3), for each of the forwarding elements (NNFE) in the neighbor list, for obtaining an actual rule set (ARS) for each of the forwarding elements (NNFE), the steps of
computing one or more relations between the match sets based on match field relations,
computing one or more relations between the action sets,
computing one or more interactions between the rules based on the computed relations between the match sets and the action sets, wherein each rule is tested against another rule for determining the interaction, wherein all of duplication, redundancy, generalization, shadowing, correlation, inclusion and extension as rule interactions are determined, and
reducing the rule set to an actual rule set according to the computed interactions so that the actual rule set comprises only rules with no interactions among the rules,
d1) determining (T4) one or more interactions between the actual rule sets (ARS) of two neighbor forwarding elements (FE, NNFE), and
e1) reducing (T5) the actual rules sets (ARS) according to the computed interactions so that the actual rules sets (ARS) comprise only rules with no interactions to the rule (R) of the respective other actual rule set (ARS);
a merging computer device that merges the disjoint actual rule sets (ARS) to one new actual rule set (ARS) representing both the neighbor forwarding element (NNFE) and the selected forwarding element (SFE) and to define a merged forwarding element (MFE) with the new actual rule set (ARS) as new selected forwarding element (SFE); and
an iteration computer device that performs steps c2) to g2) iteratively as follows:
c2) determining (V3) a neighbor list of next neighbors (NNFE) with regard to the selected forwarding element (SFE),
d2) performing (V4) steps c1) to e1) as follows:
c1) performing (T3), [INSERT ACTUAL STEPS] for each of the forwarding elements (NNFE) in the neighbor list:
a) computing (S1) one or more relations between the match sets (M) based on match field relations (f),
b) computing (S2) one or more relations between the action sets (A),
c) computing (S3) one or more interactions between the rules (R) based on the determined relations between the match sets (M) and the action sets (A), wherein each rule (Rx) is tested against another rule (Ry) for determining the interaction, and
d) computing an actual rule set by reducing (S4) the rule set (RS) to an actual rule set (ARS) according to the determined interactions so that the actual rule set (ARS) comprises only rules (R) with no interactions among the rules,
for obtaining an actual rule set (ARS) for each of the forwarding elements (NNFE), d1) determining (T4) one or more interactions between the actual rule sets (ARS) of two neighbor forwarding elements (FE, NNFE), and e1) reducing (T5) the actual rules sets (ARS) according to the computed interactions so that the actual rules sets (ARS) comprise only rules with no interactions to a rule (R) of the respective other actual rule set (ARS), e2) merging (V5) the disjoint actual rule sets to one new actual rule set (ARS) representing both the neighbor forwarding element (NNFE) and the selected forwarding element (SFE), f2) defining (V6) a merged forwarding element (MFE) with the new actual rule set (ARS) as new selected forwarding element (SFE), and g2) performing (V7) the steps c2) to f2) iteratively until a predetermined number have been merged to two forwarding elements (FE).

14. The method according to claim 1, wherein the rules (R) are installed on the forwarding element (FE) by a centralized controller.

15. The method according to claim 1, wherein the computed interactions are announced in at least a part of the network (N).

16. The method according to claim 6, wherein rules (R) are installed on a forwarding element (FE) by a centralized controller.

17. The method according to claim 6, wherein the computed interactions are announced in at least a part of the network (N).

* * * * *